US008066500B2

(12) United States Patent
Hall et al.

(10) Patent No.: US 8,066,500 B2
(45) Date of Patent: Nov. 29, 2011

(54) HIGH PRESSURE, HIGH TEMPERATURE BACK-UP WITH A CIRCUMFERENTIAL RELIEF

(76) Inventors: David R. Hall, Provo, UT (US); Scott Dahlgren, Alpine, UT (US)

( * ) Notice: Subject to any disclaimer, the term of this patent is extended or adjusted under 35 U.S.C. 154(b) by 175 days.

(21) Appl. No.: 12/608,258

(22) Filed: Oct. 29, 2009

(65) Prior Publication Data
US 2011/0104318 A1   May 5, 2011

(51) Int. Cl.
*B29C 43/04* (2006.01)
(52) U.S. Cl. ... 425/77; 425/193; 425/330; 425/DIG. 26; 419/48; 419/51
(58) Field of Classification Search .......... 425/77, 425/405.1–405.2, 193, 330, DIG. 26; 419/48–49, 419/51, 54–55, 68
See application file for complete search history.

(56) References Cited

U.S. PATENT DOCUMENTS

| | | |
|---|---|---|
| 2,918,699 A | 12/1959 | Hall |
| 2,968,837 A | 1/1961 | Zeitlin et al. |
| 3,093,862 A | 6/1963 | Gerard |
| 3,159,876 A | 12/1964 | Hall |
| 3,182,353 A | 5/1965 | Hall |
| 3,255,490 A | 6/1966 | Sturm |
| 3,257,688 A | 6/1966 | Levey |
| 5,744,170 A | 4/1998 | Hall |
| 5,780,139 A | 7/1998 | Carter |
| 5,851,568 A | 12/1998 | Huang |
| 6,022,206 A | 2/2000 | McNutt |
| 6,186,763 B1 | 2/2001 | Scanlan |
| 6,336,802 B1 | 1/2002 | Hall |
| 7,513,764 B1* | 4/2009 | Hall et al. ............ 425/77 |
| 2007/0009626 A1 | 1/2007 | Hall |
| 2008/0193579 A1* | 8/2008 | Hall et al. ............ 425/77 |

* cited by examiner

*Primary Examiner* — Richard Crispino
*Assistant Examiner* — Thukhanh Nguyen
(74) *Attorney, Agent, or Firm* — Tyson J. Wilde; Philip W. Townsend, III

(57) ABSTRACT

In one aspect of the present invention, a cartridge assembly for connection to the frame of a high-pressure, high-temperature press comprises a front end comprising a back-up intermediate and coaxial with an anvil and a piston, the anvil comprising a proximal end in contact with the back-up and a distal end that forms part of a pressurized chamber within the frame, the back-up comprising a proximal end comprising a first diameter proximate an interface with a distal end of the piston, and a distal end comprising a second diameter proximate an interface with the proximal end of the anvil, the back-up comprising one or more circumferential reliefs disposed on the first diameter.

19 Claims, 8 Drawing Sheets

HIGH PRESSURE, HIGH TEMPERATURE BACK-UP WITH A CIRCUMFERENTIAL RELIEF

BACKGROUND OF THE INVENTION

This invention relates to high-pressure, high-temperature processing equipment, specifically for the formation of superhard materials. The equipment used to apply high pressure and high temperature may be subject to adverse conditions during use, including high levels of mechanical stress. It is desirable to provide high-pressure, high-temperature processing equipment that is able to regularly withstand high levels of stress and high temperatures without failure. High-pressure, high-temperature processing equipment is disclosed in the prior art.

U.S. Pat. No. 6,336,802 to Hall discloses a reduced mass unitary frame having a cubic, spherical, prismatic, or ellipsoidal shape, a plurality of intersecting threaded boreholes that describe an spherical internal reaction chamber, and a plurality of unitary cartridges with internal fluid intensification for an ultra-high pressure, high-temperature, fluid driven press apparatus capable of reaching pressures in excess of 35 kilobars and temperatures above 1000 degrees centigrade, useful in the production of such high-pressure products as diamond, polycrystalline diamond, cubic boron nitride, and like superhard materials.

BRIEF SUMMARY OF THE INVENTION

In one aspect of the present invention, a cartridge assembly for connection to the frame of a high-pressure, high-temperature press comprises a front end comprising a back-up intermediate and coaxial with an anvil and a piston, the anvil comprising a proximal end in contact with the back-up and a distal end that forms part of a pressurized chamber within the frame, the back-up comprising a proximal end comprising a first diameter proximate an interface with a distal end of the piston, and a distal end comprising a second diameter proximate an interface with the proximal end of the anvil, the back-up comprising one or more circumferential reliefs disposed on the first diameter.

The cartridge assembly may comprise a threaded portion for connection to the frame of a high-pressure, high-temperature press. The threaded portion may comprise tapered threads that distribute stress substantially evenly across the threaded portion. The cartridge assembly may comprise a cartridge body having indexing detents corresponding to indexing protrusions on the frame of the high-pressure, high-temperature press. The cartridge assembly may comprise a radially compressive element disposed on an outer surface of the cartridge body. The compressive element may increase the load bearing capability of the cartridge body and help the cartridge withstand high pressures developed in the press.

The cartridge assembly may comprise an electrically insulating disc disposed intermediate the distal end of the piston and the proximal end of the back-up. The electrically insulating disc may comprise a composite material such as aramid fibers, glass fibers, carbon fibers, or other fibers in a resin or polymer binder.

The back-up may comprise a substantially conical portion intermediate the first and second diameters. In some embodiments, the substantially conical portion may be substantially concave.

The first diameter of the back-up may be larger than the second diameter. In some embodiments, the first diameter may be more than twice the second diameter.

The circumferential reliefs disposed on the first diameter may comprise half-round cross-sectional geometry. The cross-sectional geometry may comprise a variable radius in some embodiments. The cross-sectional geometry may comprise a chord of a circle, or comprise substantially elliptical geometry. In other embodiments, the cross-sectional geometry may be generally polygonal, and in some embodiments the back-up may comprise multiple grooves having differing internal diameters.

The conical portion may comprise a transitional area proximate the second diameter wherein an outer surface of the back-up extends normal from the plane of the second diameter to the conical portion.

The interface intermediate the anvil and the back-up may comprise non-planer geometry. In some embodiments, the interface intermediate the piston and the back-up may comprise non-planer geometry. In some embodiments, strengthening ribs may be disposed within the circumferential grooves on the back-up.

DETAILED DESCRIPTION OF THE INVENTION AND THE PREFERRED EMBODIMENT

Figure 1:
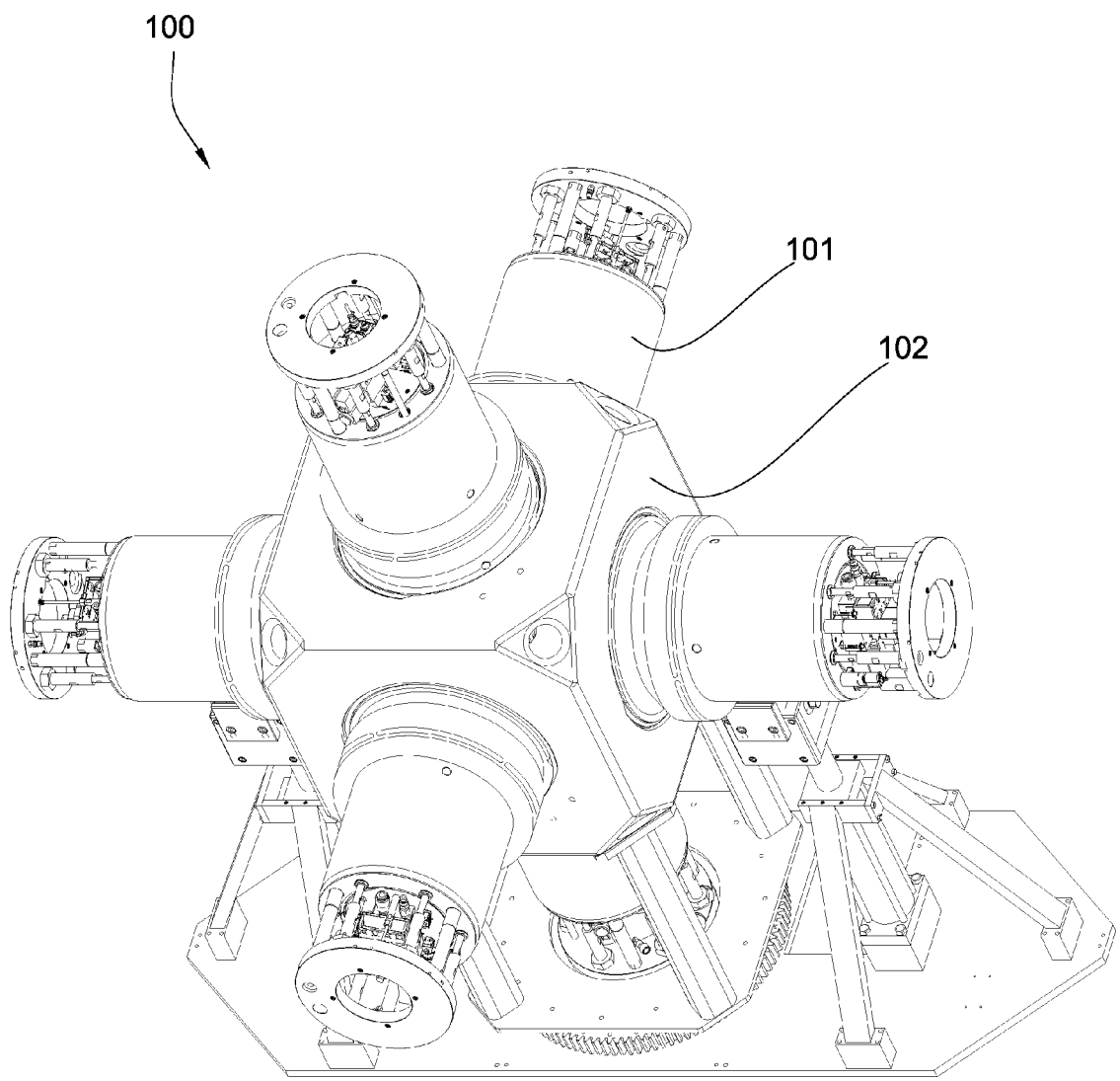
FIG. 1 is a perspective view of an embodiment of a high-pressure, high-temperature press.

Referring now to the figures, FIG. 1 is a perspective diagram depicting an embodiment of a high pressure, high temperature press 100. In a preferred embodiment the high pressure, high temperature press 100 may comprise six cartridge assemblies 101 that are connected to a press frame 102. The cartridge assemblies 101 may comprise movable anvils that converge within a central portion of the press frame 102 to form a pressurized chamber into which may be placed a reaction cell that may be utilized to form super hard materials such as synthetic diamond or cubic boron nitride.

Figure 2:
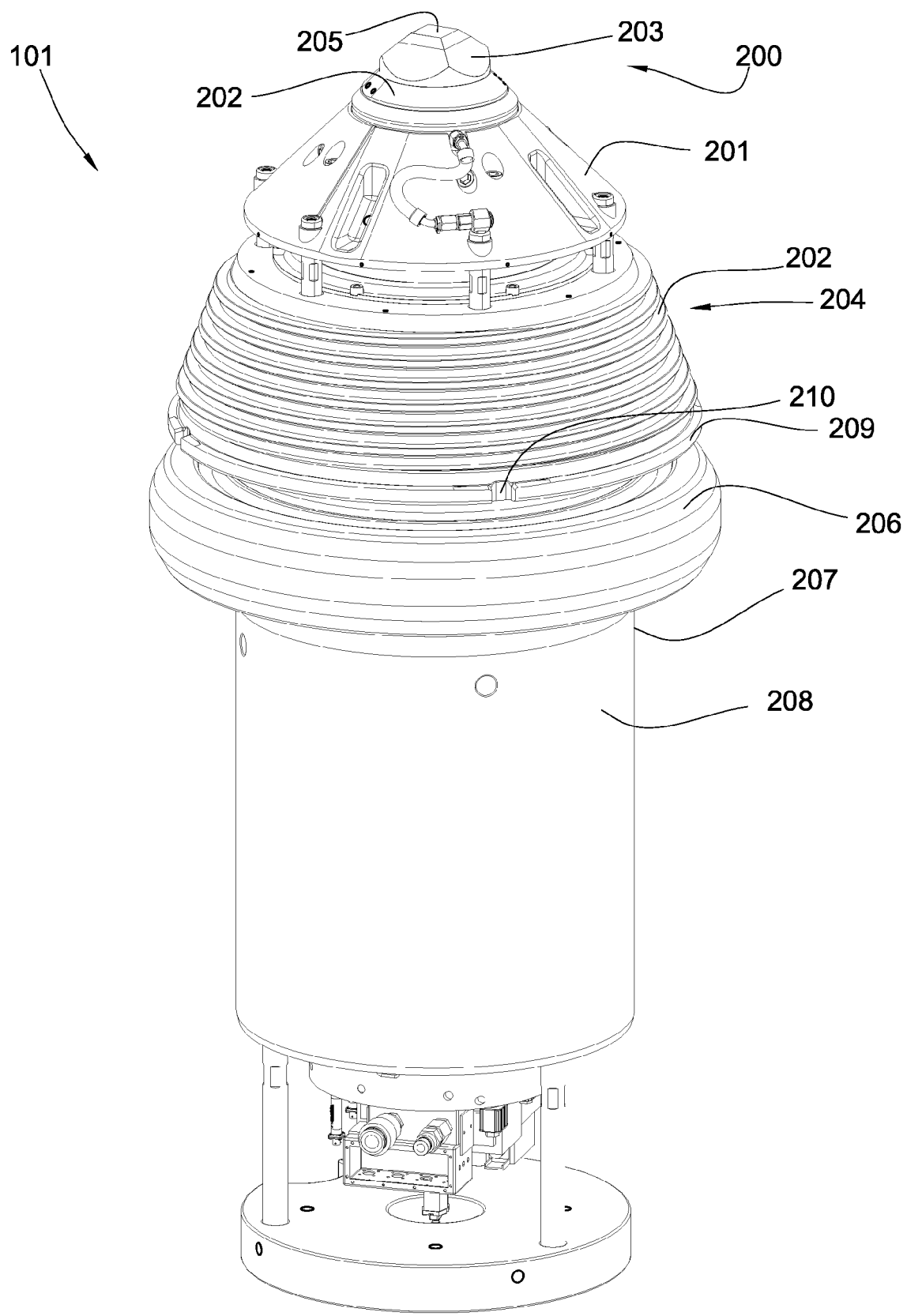
FIG. 2 is a perspective view of an embodiment of a cartridge assembly.

FIG. 2 discloses a single cartridge assembly 101. The cartridge assembly 101 comprises a working end 200 comprising a key ring 201, a binding ring 202, and an anvil 203. The cartridge assembly 101 may comprise a truncated conical portion 204. An external threadform 202 may be disposed on the truncated conical portion 204. The anvil 203 comprises a face 205 that compresses against a face of a reaction cell. In operation, six anvil faces 205 corresponding to six orthogonally aligned cartridges impinge on the corresponding reaction cell faces during the press cycle, elevating the pressure inside the reaction cell to a level conducive to sintering super hard materials.

The cartridge assembly 101 also comprises a radial compressive element 206 disposed on an outer diameter 207 of the press cartridge body 208. High pressures inside the cartridge may cause elastic or plastic deformation of the press cartridge body 208, and the radial compressive element 206 may place a compressive load on the exterior of the cartridge body and counteract the large compressive load from inside the cartridge body, preventing deflection or deformation. The radial compressive element may be machined from steel or titanium alloys or other metals and may comprise an interference fit with the press cartridge body 208. In this embodiment, the radial compressive element 206 may comprise a single annular ring. In other embodiments, the radial compressive element may comprise multiple rings stacked axially, multiple rings stacked radially, or high tensile strength fabric or composite materials such as carbon fiber, aramid fibers, or fiberglass.

In some embodiments, the press cartridge 101 may comprise a locking ring 209 comprising one or more indexing detents 210. Indexing protrusions located on the press frame may correspond to the detents 210 and lock the cartridge in position relative to the frame. Any rotation of the cartridge relative to the frame may prevent the anvils from effectively pressurizing the reaction cell, and may result in mechanical contact between anvils and cause failure of the press. The locking protrusions on the frame may also be adapted to provide preload to the cartridge threads to remove lash and positively locate the cartridge assembly relative to the frame.

Figure 3:
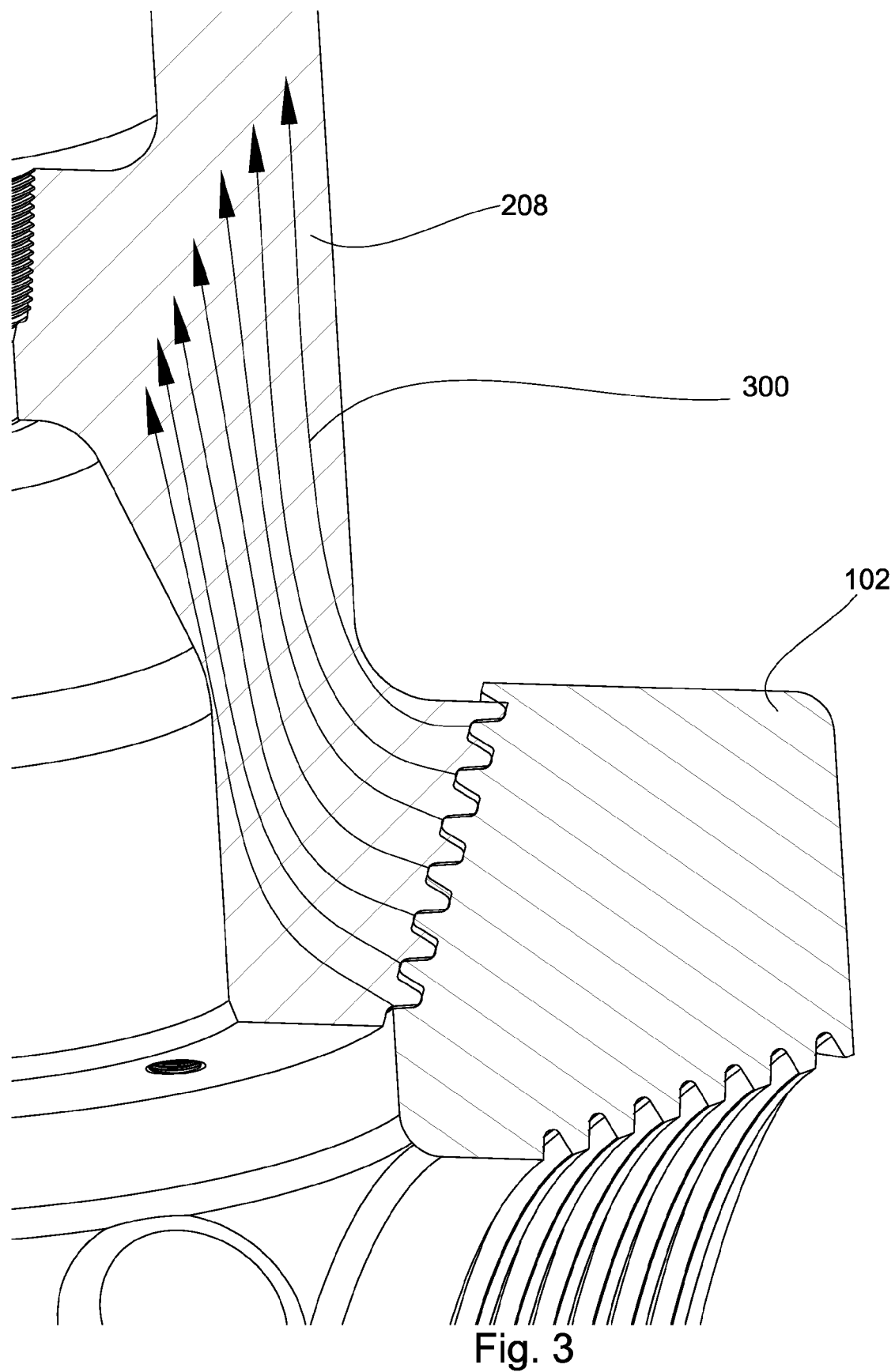
FIG. 3 is a cross-sectional view of another embodiment of a cartridge body and a unitary frame.

FIG. 3 diagrammatically depicts strain force lines 300 in strain matched threads of an embodiment of a press cartridge assembly 208 and a press frame 102. It is believed that three variables generally determine the ability of a threaded connection to withstand the forces applied to it during a press cycle: the radius cut, the degree of taper, and the type of threadform. By proper balancing of these three variables, it is believed that the threaded connection is substantially strain matched such that each thread bears an equal amount of the reaction forces propagated through the connection during a high pressure high temperature press cycle. The strain force lines 300 illustrate how the reaction force is believed to evenly propagate through the threaded connection to the hydraulic cartridge 208. This may enable the high pressure high temperature apparatus to withstand higher reaction forces.

Figure 4:
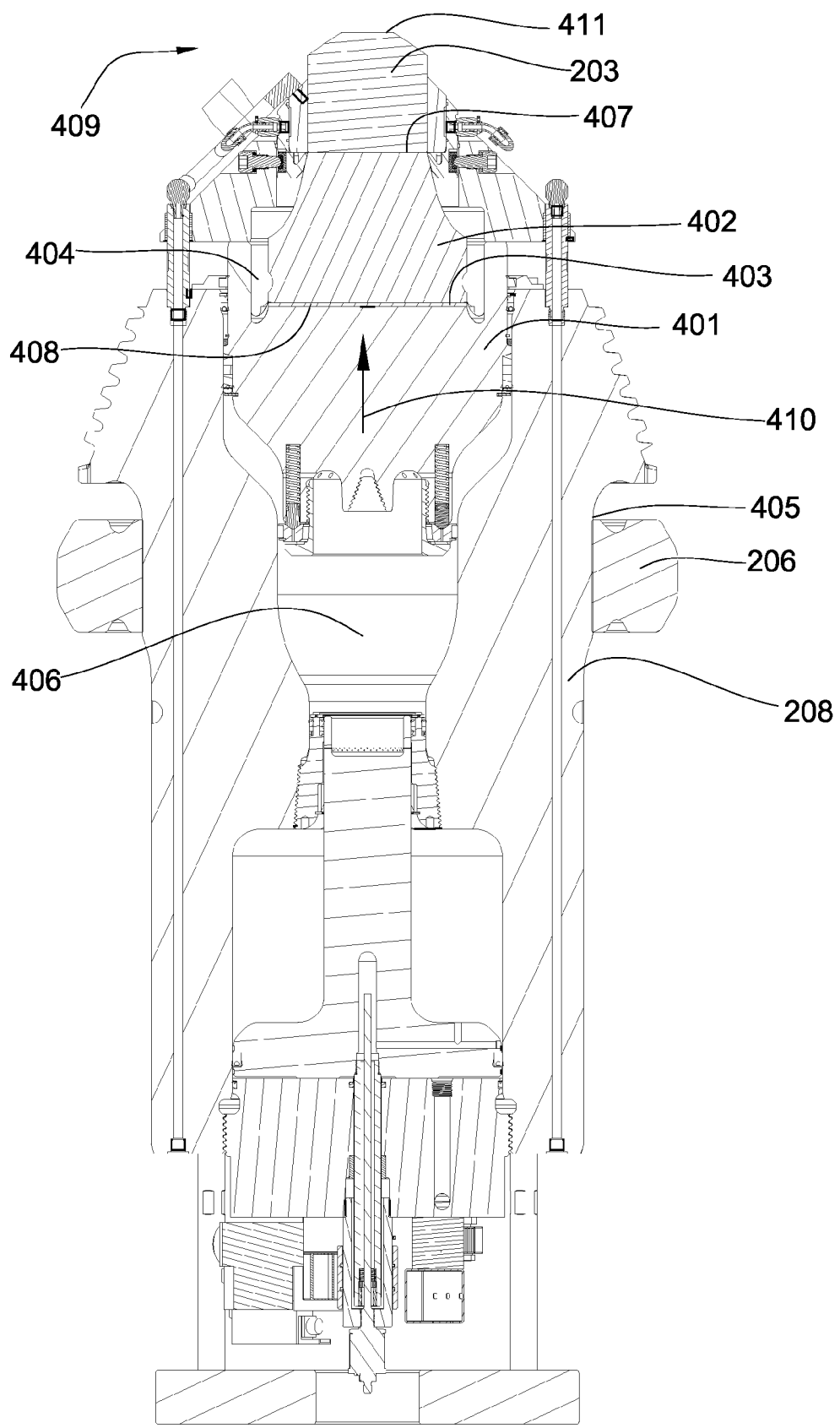
FIG. 4 is a cross-sectional view of an embodiment of a cartridge assembly.

FIG. 4 is a cross-section of an embodiment of a press cartridge 101. In this embodiment, the cartridge assembly comprises a piston 401, an anvil 203, and a back-up 402. During a press cycle, a high voltage is applied across the press anvils, and resistance heating in the reaction cell raises the temperature of the reaction cell and super hard material to sintering temperature. The anvil 203 and back-up 402 must be electrically insulated from the piston 401 to prevent short circuiting the applied voltage. In this embodiment, an electrically insulating disk 403 and an electrically insulating ring 404 are disposed intermediate the back-up 402 and piston 401. The electrically insulating disk 403 must be able to withstand high compressive loads during a press cycle as force is transferred through the piston 401 to the back-up 402 and anvil 203. Accordingly, the electrically insulating disk may be constructed from high-tensile strength fibers inside a cured resin. The fibers may be aramid or glass fibers, or any other electrically insulating high-strength fiber. The disk may comprise multiple layers of woven fibers, and the multiple layers may be laminated such that the orientation of the weave is rotated by a chosen amount on each successive layer to provide isotropic strength properties. In one embodiment, the electrically insulating disk may comprise at least 40 layers of high strength material, and each successive layer may be rotated 45 degrees with respect to the layer below it. The electrically insulating ring 404 may comprise a composite material similar to the disk 403, an insulating ceramic, or an insulating polymer.

Also disclosed in FIG. 4 is a radial compressive element 206 disposed on an outer diameter 405 of the press cartridge body 208, adjacent a high pressure chamber 406 of the press cartridge assembly 101.

The back-up 402 comprises a distal end comprising an interface 407 with a proximal end of the anvil 203. Interface 407 comprises a diameter which may be the same diameter as the proximal end of the anvil 203. A distal end 409 of the anvil comprises a face 411 that forms one sixth of a reaction chamber. The back-up also comprises a proximal end comprising an interface 408 with the piston 401. In this embodiment, the electrically insulating disk 403 is disposed intermediate the proximal end of the back-up 402 and the piston 401.

During a cycle of the high-pressure, high-temperature press, hydraulic fluid is forced into a high-pressure chamber 406 of the press cartridge. The hydraulic fluid forces the piston 401 in direction 410, and the force is transferred through the electrically insulating disk 403 to the back-up 402, through the back-up the anvil, and through the anvil to a reaction cell placed in the high-pressure, high-temperature press. As shown in FIG. 4, the force is transferred through successively smaller areas before finally being applied to the reaction cell. Consequently, the compressive stress in each part increases and reaches a maximum at the face 411 of the anvil 203 that bears against the reaction cell. The high compressive stress may cause failure of the back-up, anvil, or other components if the stress is not evenly distributed.

Figure 5:
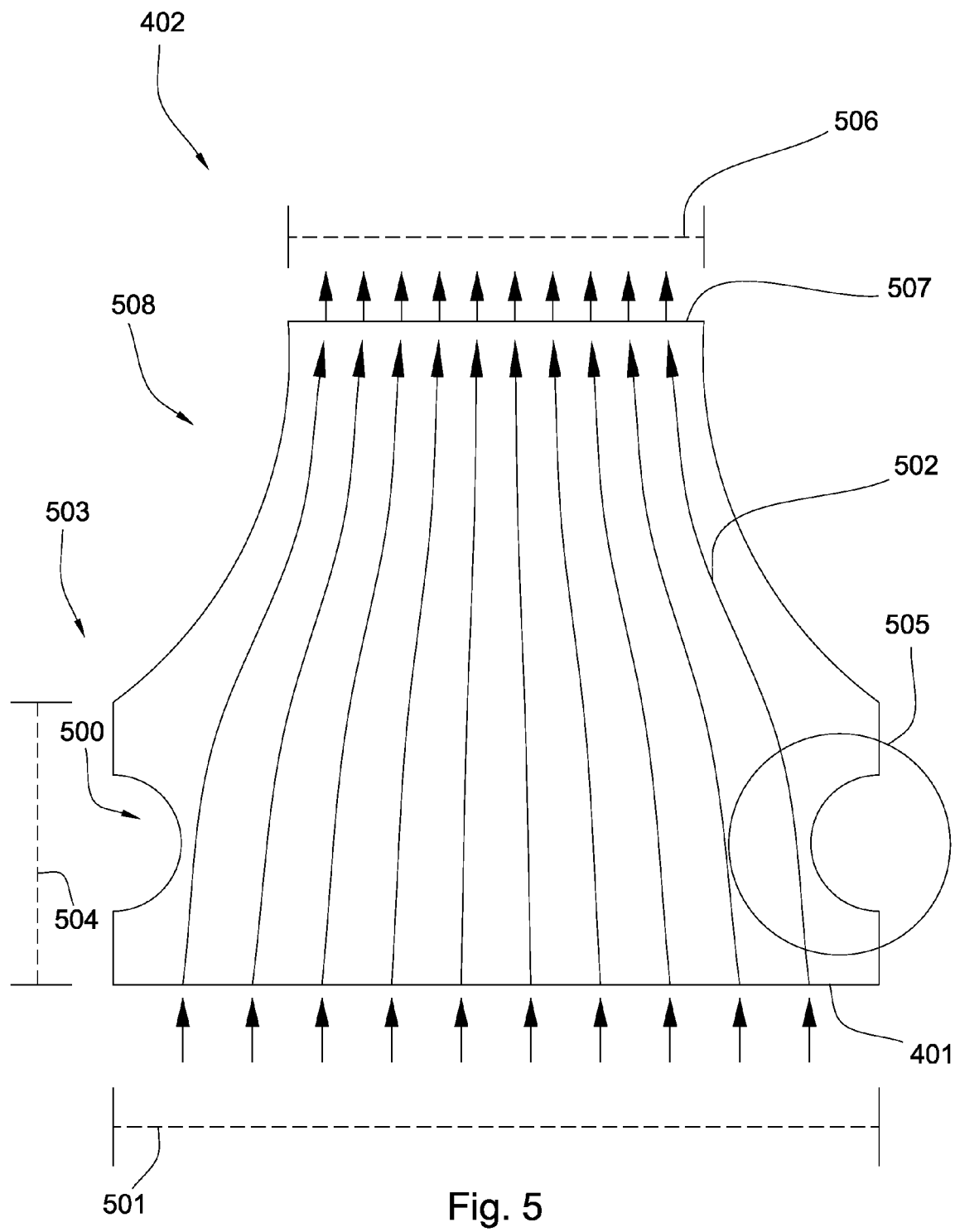
FIG. 5 is a cross-sectional view of an embodiment of a back-up.

FIG. 5 discloses an embodiment of a back-up 402. In this embodiment, the back-up 402 comprises a circumferential groove 500 formed in a first diameter 501 proximate an interface with the piston 401. The back-up 402 comprises a generally cylindrical portion 503 substantially defined by the first diameter 501 and an axial dimension 504. The back-up 402 also comprises an interface 507 with the anvil comprising a second diameter 506. In order to increase the pressure to a level sufficient to sinter the super hard material, the second diameter may be substantially smaller than the first diameter. In some embodiments, the first diameter 501 may be more than twice the second diameter 506, which may provide a pressure multiplication of more than 4 times. Force flow lines 502 are an imaginary representation of the stress distribution created in the back-up 402 during a cycle of the high pressure high temperature press.

The back-up 402 may comprise a substantially conical portion 508 intermediate the generally cylindrical portion 503 and the interface with the anvil 507. The conical portion 508 may allow a gradual transition in stress levels from the interface 401 with the piston to the interface 507 with the anvil. The conical portion may comprise a linear taper, a portion of an arc having a constant radius, a portion of a parabola, or other conic shapes. In one embodiment, the conical portion comprises a concave conic shape having a conic form factor of 0.6 to 0.9.

The circumferential groove 500 may modify the stress distribution in region 505 and allow a more gradual transition between the stress level at the interface 401 with the piston and the higher stress level at the interface 507 with the anvil. Effectively, the circumferential groove 500 creates a gradually increasing stress distribution in the back-up from the interface 401 to the interface 507, while retaining the axial dimension 504 and the resulting generally cylindrical portion 503. The generally cylindrical portion 503 may provide lateral support for the back-up when the back-up is installed in the piston.

The back-up may be manufactured from high strength steel alloys or from other metals such as carbide, tungsten carbide, titanium, platinum, molybdenum, niobium, or combinations thereof. The circumferential groove 500 may be formed in the first diameter 501 of the back-up by machining, forging, rolling, or by a casting or sintering operation.

Figure 6:
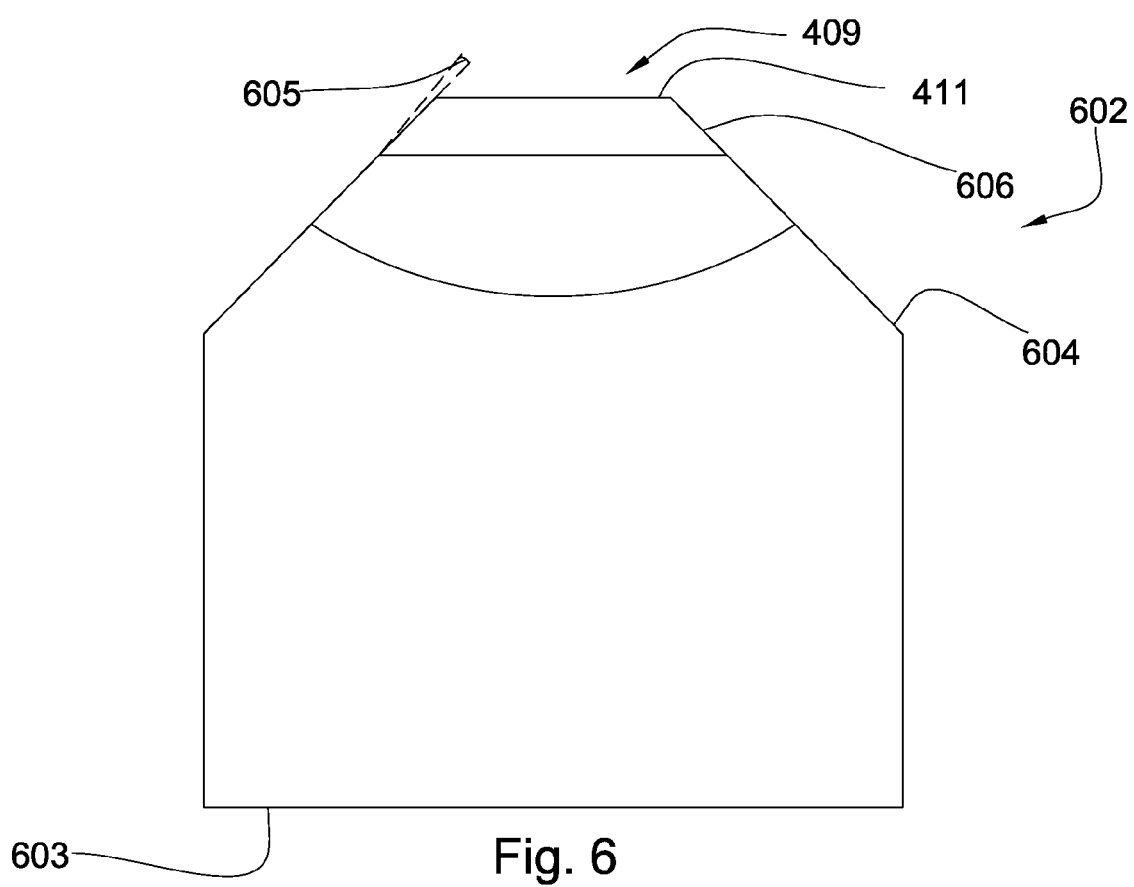
FIG. 6 is an orthogonal view of an embodiment of an anvil.

FIG. 6 is a perspective diagram of an embodiment of an anvil 602 which may comprise a material selected from cemented metal carbide, tungsten carbide, or combinations thereof. The anvil 602 may comprise a cylindrical base 603 connected to a tapered portion 604 leading to a working face 411 of the anvil 602 opposite the base. In some embodiments the tapered portion 604 may form a 45 degree angle with the cylindrical base 603 while the chamfered region 606 may comprise a second surface area that substantially forms a 2.5 degree angle 605 with the tapered portion 604. In other embodiments the anvil 602 may comprise a generally frusto-pyramidal shape comprising rounded corners further comprising a conic form factor of 0.6 to 0.9. In some embodiments the anvil 602 may comprise a distal end 409 which is adapted to form a part of a pressurized chamber within the press frame.

Figure 7:
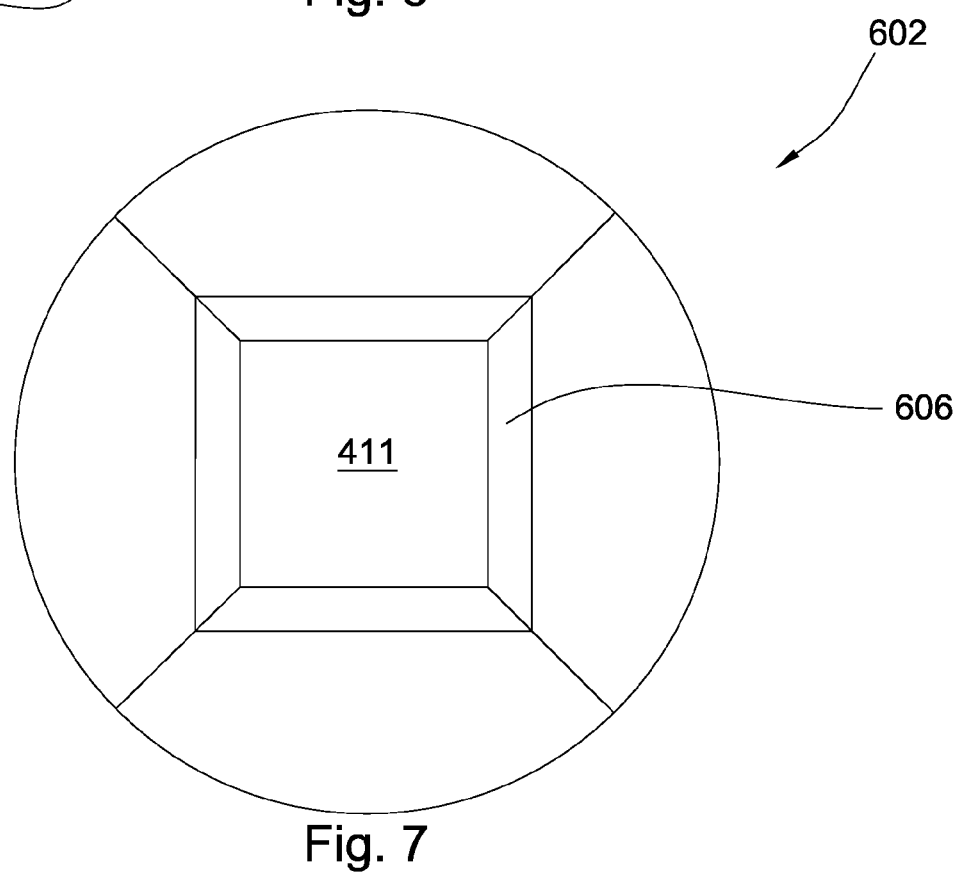
FIG. 7 is an orthogonal view of another embodiment of an anvil.

FIG. 7 is a top perspective diagram of an embodiment of an anvil 602. The anvil 602 may comprise a chamfered region 606 that comprises a second surface area that is 1.1 to 2.5 times greater than a first surface area of the working face 411. In a preferred embodiment the second surface area may comprise a surface area 1.5 times greater than the first surface area. In other embodiments the anvil 602 may comprise a chamfered region 606 that forms a wedge area for receiving excess payload that may extrude from the reaction chamber and form a gasket when the anvils 602 are brought together within the press during operation.

Figure 8:
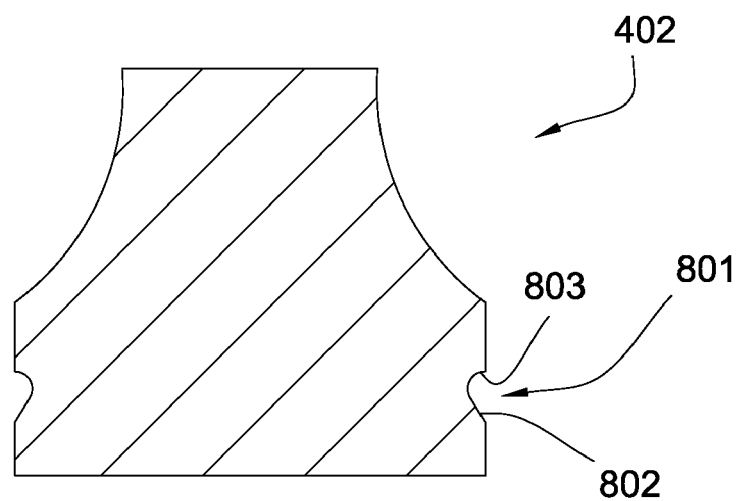
FIG. 8 is a cross-sectional view of another embodiment of a back-up.

FIG. 8 is a cross-sectional view of another embodiment of a back-up 402. In this embodiment, the circumferential groove 801 comprises cross-sectional geometry with a variable radius. A large radius portion 802 transitions to a smaller radius portion 803, thus, providing a gradual reduction in axial cross-sectional area of the back-up and therefore a gradual change in stress levels.

Figure 9:
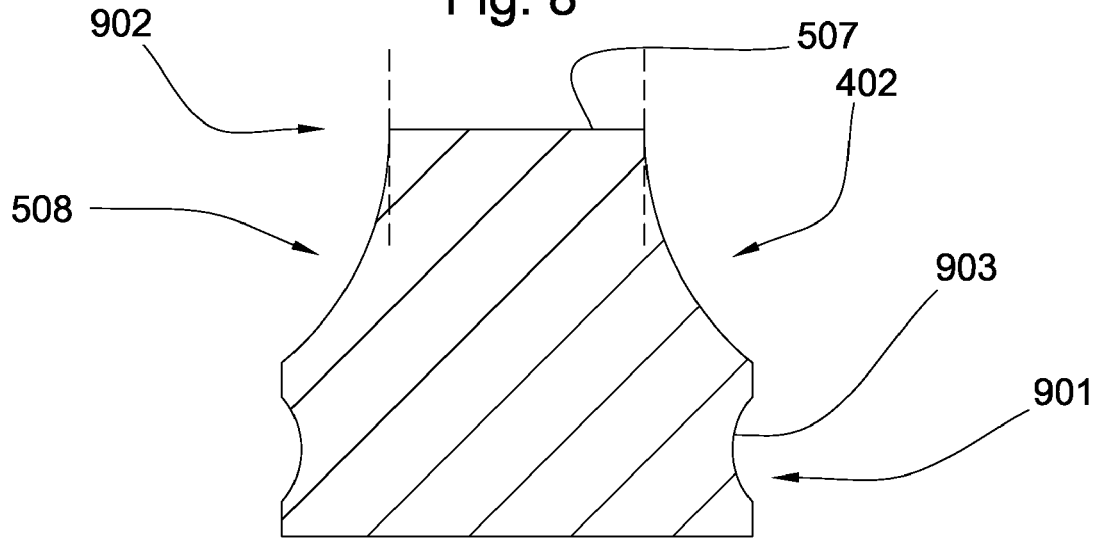
FIG. 9 is a cross-sectional view of another embodiment of a back-up.

FIG. 9 discloses a cross-sectional view of another embodiment of a back-up 402. In this embodiment, the back-up comprises a cylindrical surface 902 extending normal to the plane of the interface 507 with the anvil. Cylindrical surface 902 gradually transitions into the conical portion 508. In the embodiment of FIG. 9, the circumferential groove 901 has a cross-section 903 comprising a chord of a circle.

Figure 10:
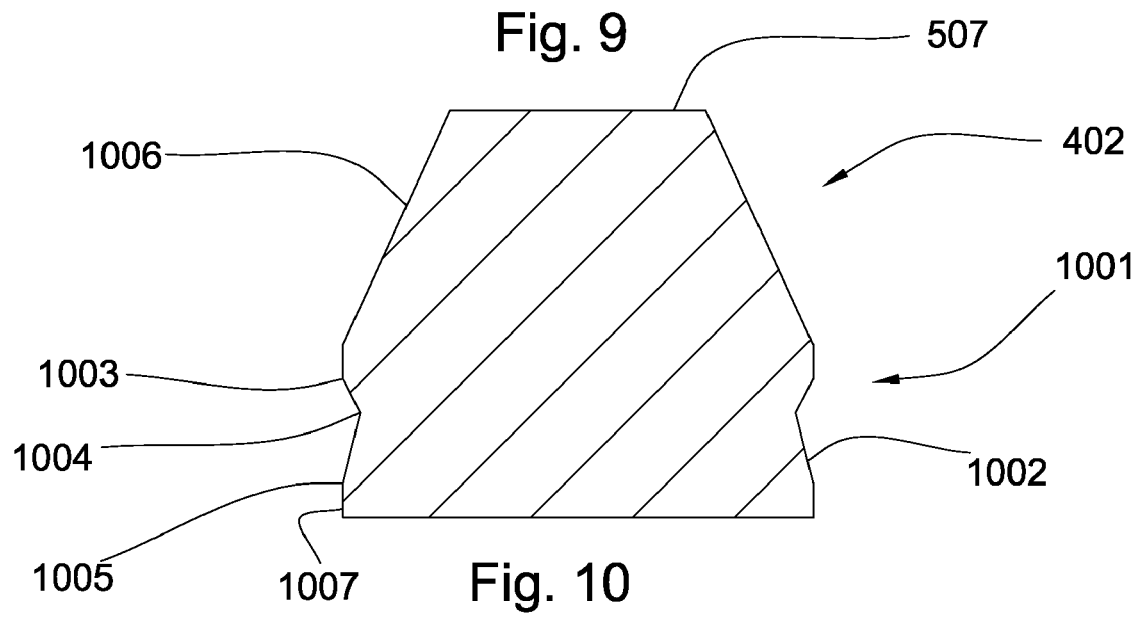
FIG. 10 is a cross-sectional view of another embodiment of a back-up.

FIG. 10 discloses another embodiment of a back-up 402. In this embodiment, the circumferential groove 1001 comprises a substantially polygonal cross-section 1002. Machining a cross-section with substantial curvature may require extensive CNC programming and long machining times. Accordingly, a polygonal cross-section 1002 may be used, with chamfers or fillets at locations 1003, 1004, and 1005. FIG. 10 also discloses a linear tapered portion 906 disposed intermediate the interface 507 with the anvil and a first diameter 1007.

Figure 11:
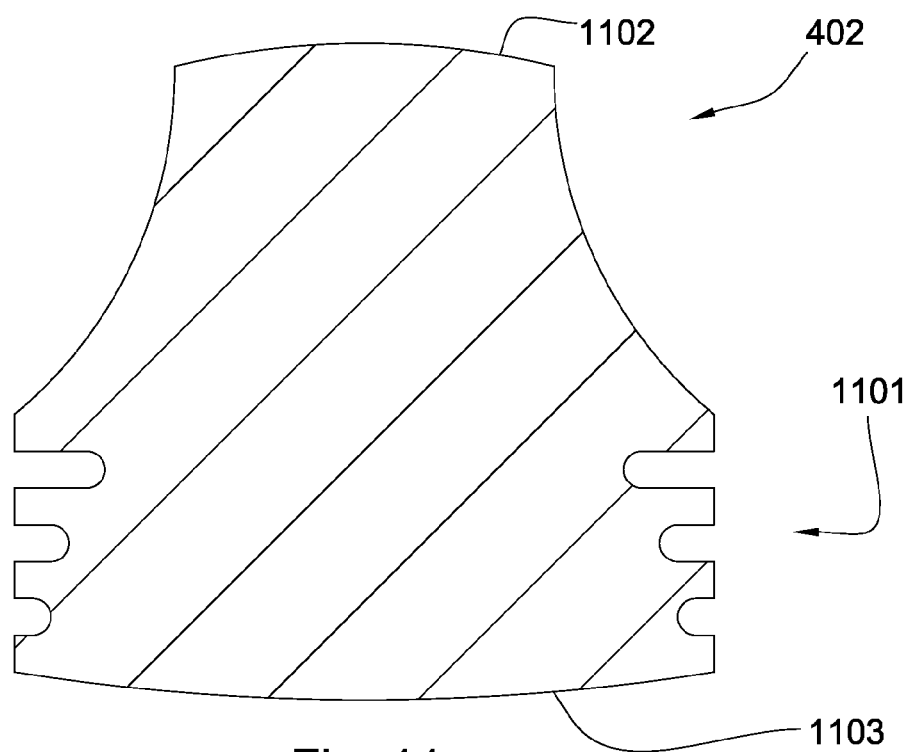
FIG. 11 is a cross-sectional view of another embodiment of a back-up.

FIG. 11 discloses another embodiment of a back-up 402. In this embodiment, the back-up 402 comprises a plurality of circumferential grooves 1101, each comprising a different internal diameter. In this embodiment, interfaces 1102 and 1103 comprise non-planer geometry. Mating non-planer geometry may be found on the corresponding interfaces on the piston and anvil and may lessen the stress present at the interface by increasing the interfacial surface area.

Figure 12:
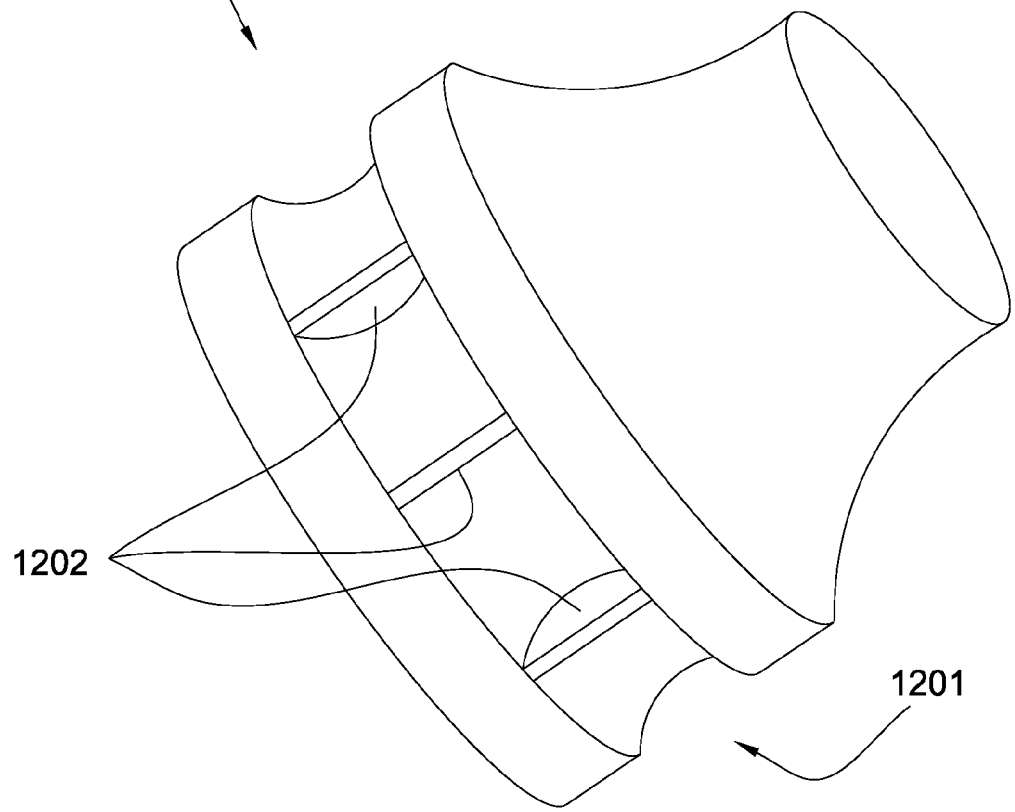
FIG. 12 is a perspective view of another embodiment of a back-up.

FIG. 12 discloses another embodiment of a back-up 402. In this embodiment, circumferential groove 1201 comprises ribs 1202 that provide additional lateral support when the back up 402 is installed in a piston. The ribs may be welded or brazed to the back-up after the circumferential groove 1201 is formed, or the ribs may be formed or machined integral with the back-up.

Whereas the present invention has been described in particular relation to the drawings attached hereto, it should be understood that other and further modifications apart from those shown or suggested herein, may be made within the scope and spirit of the present invention.

What is claimed is:

1. A cartridge assembly for connection to a frame of a high pressure, high temperature press, comprising:
   a front end comprising a back-up intermediate and coaxial with an anvil and a piston;
   the anvil comprising a proximal end in contact with the back-up and a distal end that forms part of a pressurized chamber within the frame;
   the back-up comprising a proximal end comprising a first diameter proximate an interface with a distal end of the piston, and a distal end comprising a second diameter proximate an interface with the proximal end of the anvil;
   the back-up comprising a first and a second circumferential reliefs disposed on the first diameter; and
   the first and second reliefs comprise different internal diameters.

2. The cartridge assembly of claim 1, wherein the cartridge body comprises tapered threads.

3. The cartridge assembly of claim 1, wherein the cartridge body comprises indexing detents corresponding to indexing protrusions on the frame.

4. The cartridge assembly of claim 1, wherein the cartridge body comprises a compressive element disposed on an outer diameter of the cartridge body.

5. The cartridge assembly of claim 1, wherein the cartridge assembly comprises an electrically insulating disc disposed intermediate the distal end of the piston and the proximal end of the back-up.

6. The cartridge assembly of claim 5, wherein the electrically insulating disc comprises, fiberglass, carbon fiber, or other composite material.

7. The cartridge assembly of claim 1, wherein the back-up comprises a substantially conical portion intermediate the first and second diameters.

8. The cartridge assembly of claim 7, wherein the substantially conical portion is substantially concave.

9. The cartridge of claim 1, wherein the first diameter is larger than the second diameter.

10. The cartridge of claim 1, wherein the first diameter is at least twice as large as the second diameter.

11. The cartridge assembly of claim 1, wherein the circumferential reliefs comprise a half-round cross-section.

12. The cartridge assembly of claim 1, wherein the circumferential grooves comprise a variable radius cross-section.

13. The cartridge assembly of claim 1, wherein the circumferential grooves comprise a cross-section comprising a chord of a circle.

14. The cartridge assembly of claim 1, wherein the circumferential grooves comprise generally partial elliptical geometry.

15. The cartridge assembly of claim 11, wherein the back-up comprises a transitional area proximate the second diameter wherein an outer surface of the back-up extends normal to the plane of the second diameter towards the conical portion.

16. The cartridge assembly of claim 1, wherein the circumferential grooves comprise generally polygonal geometry.

17. The cartridge of claim 1, wherein the interface intermediate the back-up and the anvil comprises non-planer geometry.

18. The cartridge of claim 1, wherein the interface intermediate the back-up and the piston comprises non-planer geometry.

19. The cartridge of claim 1, wherein the circumferential reliefs comprise support ribs.

* * * * *